United States Patent
Yang et al.

(10) Patent No.: US 11,958,789 B1
(45) Date of Patent: Apr. 16, 2024

(54) METHOD FOR DETERMINING CONSISTENCY COEFFICIENT OF POWER-LAW CEMENT GROUT

(71) Applicant: Kunming University of Science and Technology, Kunming (CN)

(72) Inventors: Zhi-quan Yang, Kunming (CN); Jun-fan Xiong, Kunming (CN); Ying-yan Zhu, Kunming (CN); Yi Yang, Kunming (CN); Yong-shun Han, Kunming (CN); Muhammad Asif Khan, Kunming (CN); Jian-bin Xie, Kunming (CN); Tian-bing Xiang, Kunming (CN); Bi-hua Zhang, Kunming (CN); Han-hua Xu, Kunming (CN); Jie Zhang, Kunming (CN); Shen-zhang Liu, Kunming (CN); Qi-jun Jia, Kunming (CN); Cheng-yin Ye, Kunming (CN); Gang Li, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 18/536,550

(22) Filed: Dec. 12, 2023

(30) Foreign Application Priority Data

Dec. 15, 2022 (CN) .......................... 202211610283.2

(51) Int. Cl.
*C04B 7/36* (2006.01)
(52) U.S. Cl.
CPC .................................. *C04B 7/361* (2013.01)

(58) Field of Classification Search
CPC ..................................................... C04B 7/361
See application file for complete search history.

(56) References Cited

FOREIGN PATENT DOCUMENTS

CN 113158140 A * 7/2021

OTHER PUBLICATIONS

Du Jun et al., Influence of Water Cement Ratio and Hydration Time on the Rheological Properties of Cement Slurry, China Concrete and Cement Products, Nov. 20, 2022, pp. 18-21, 26, Issue No. 11.
CNIPA, Notification of First Office Action for CN202211610283.2, dated Jan. 19, 2023.
Kunming University of Science and Technology (Applicant), Reply to Notification of First Office Action for CN202211610283.2, dated Jan. 20, 2023.
Kunming University of Science and Technology (Applicant), (allowed) Replacement claims for CN202211610283.2, dated May 16, 2023.
CNIPA, Notification to grant patent right for invention in CN202211610283.2, dated Aug. 21, 2023.

\* cited by examiner

*Primary Examiner* — Anthony J Green
(74) *Attorney, Agent, or Firm* — Zhigang Ma

(57) ABSTRACT

A method for determining a consistency coefficient of a power-law cement grout includes: determining a water-cement ratio of the power-law cement grout; according to engineering practice requirements, determining a time required to determine the consistency coefficient of the power-law cement grout; and obtaining the consistency coefficient of the power-law cement grout. The method is accurate and reliable, requires less calculation, etc.; and has very high practical value and popularization value in environmental protection and ecological restoration.

1 Claim, 1 Drawing Sheet

METHOD FOR DETERMINING CONSISTENCY COEFFICIENT OF POWER-LAW CEMENT GROUT

TECHNICAL FIELD

The disclosure relates to the technical field of environmental protection and ecological restoration, particularly to a method for determining a consistency coefficient of a power-law cement grout.

BACKGROUND

Cement, as an inorganic cementitious material with low cost and good performance, is widely used in many engineering fields such as highways, tunnels, slopes, foundations, railways, buildings, mines, water conservancy projects, and other engineering fields. Rheological properties of cement grout greatly influence migration and diffusion of the cement grout in rock and soil, as well as the overall effectiveness of engineering applications. Therefore, the rheological properties of cement grout can be used as a theoretical basis for carrying out theoretical research on the migration and diffusion of the cement grout, and also can be used as a technical support for engineering practice. According to different rheological constitutive equations, the cement grout can be classified into three types: a Newtonian fluid, a Bingham fluid, and a power-law fluid. Specially, a consistency coefficient is used as an important rheological parameter representing a rheological property of the power-law cement grout, and can be used to reflect the rheological property of the power-law cement grout.

It is well known that the rheological properties of cement grout are influenced by comprehensive effect of a water-cement ratio and a time. Specially, "*Research on diffusion of grouting and basic properties of grouts, Ruan Wenjun, Chinese Journal of Geotechnical Engineering*, 2005, 27(1): 69-73", "*Thixotropy modeling at local and macroscopic scales, Roussel, Journal of Non-Newtonian Fluid Mechanics,* 20 Feb. 2004, Volume 117, Issues 2-3, Pages 85-95", "*Research on Time-dependent Behavior of Viscosity of Fast Curing Grouts in Underground Construction Grouting, Li Shucai, Chinese Journal of Rock Mechanics and Engineering,* 2013, Issue 1, Pages 1-7", "*Time-Dependency Analysis of Rheological Parameters of Cement Slurry, Kong Luzhi, Geotechnical Investigation & Surveying,* 2017, Issue 1, Pages 184-187", etc., have studied a change law of the rheological parameter of the cement grout with time. Moreover, "*Influence of Calcium Carbonate Whisker on Rheology of Cement Mortar with Different Water-Cement Ratios and Sand-Cement Ratios, Cao Mingli, JOURNAL OF THE CHINESE CERAMIC SOCIETY*, February, 2016, 44(2): 246-252", "*Relationships between Water-Cement Ratio and Rheological Characteristics of Power-Law Cement Grouts, Zhiquan Yang, Januarys* 2015, *Electronic Journal of Geotechnical Engineering,* 20(13):5825-5831", "*UCS Properties of Superfine Cement-Grouted Sand, Eyubhan Avci, Journal of Materials in Civil Engineering,* Jun. 27, 2016, Volume 28, No. 12", "*Time-Dependency Analysis of Rheological Parameters of Cement Slurry, Kong Luzhi, Geotechnical Investigation & Surveying,* 2017, Issue 1, Pages 184-187", etc., have studied an influence of the water-cement ratio on the rheological properties of cement grout. Although Kong Luzhi explores a quantitative relationship between the consistency coefficient of the power-law cement grout, apparent viscosity, and the water-cement ratio, Kong only analyzes qualitative change laws of the consistency coefficient, the apparent viscosity, and the water-cement ratio with time (which cannot be quantified specifically), and does not consider the comprehensive effect of the water-cement ratio and time on the consistency coefficient and the apparent viscosity.

Furthermore, a Chinese Patent Publication No. CN114720331A discloses "Method for determining permeability radius of column hemisphere of rock-soil body tortuosity power law slurry time-varying property", which obtains an initial consistency coefficient, a rheological index, and a time-varying coefficient of the power-law cement grout with a designed water-cement ratio by using a rheological test. Moreover, a Chinese Patent Publication No. CN113128140A discloses "Calculation method for tunnel advanced pre-grouting diffusion effect by considering coupling effect of power-law fluid gravity and grouting pipe embedding angle", which obtains a power-law fluid rheological curve through an indoor grouting experiment, and fits the power-law fluid rheological curve to obtain a consistency coefficient C and a rheological index n in the power-law fluid constitutive equation. However, the above-mentioned two methods both utilize the indoor rheological test to obtain a test result, and then the test result is analyzed to obtain the consistency coefficient of the power-law cement grout, which wastes time, manpower, and resources, cannot quickly obtain the consistency coefficient of the power-law cement grout, nor meet actual requirements in the engineering practice. In addition, the above-mentioned two methods have certain errors compared with the engineering practice; and therefore, accuracies of the above-mentioned two methods are not high.

In summary, based on the analysis of relevant literature and patents, it can be concluded that current research results focus solely on the individual effects of water-cement ratio and time on the rheological properties of cement grout, and a quantitative relationship of the comprehensive effect (i.e., the water-cement ratio and the time) on the rheological properties of cement grout is not well developed. Therefore, the rheological parameter of the power-law cement grout, which is widely used in the engineering field, cannot be reasonably, scientifically, effectively, and quickly determined in the engineering practice.

Therefore, there is an urgent need to provide a method for determining a consistency coefficient of a power-law cement grout, which needs to be accurate and reliable and conforms to the engineering practice.

SUMMARY

In view of the above-mentioned problems, an objective of the disclosure is to provide a method for determining a consistency coefficient of a power-law cement grout, and a technical solution adopted by the disclosure is as follows.

The method for determining the consistency coefficient of the power-law cement grout, including the following steps:

determining a water-cement ratio w of the power-law cement grout;

determining, according to engineering practice requirements, a time t required to determine the consistency coefficient c of the power-law cement grout; and obtaining the consistency coefficient c of the power-law cement grout by using a formula (1).

In an embodiment, the formula 1 of obtaining the consistency coefficient c of the power-law cement grout is expressed as follows:

$$c = 0.0387 \omega^{-6.610} e^{(0.000270 + 0.000141\omega)t} \quad \text{(formula 1)}$$

and e representing a base of a natural logarithm. ,

In an embodiment, the water-cement ratio w of the power-law cement grout is expressed by a formula 2 as follows:

$$\omega = \frac{m_w}{m_c}. \quad \text{(formula 2)}$$

In the formula 2, $m_w$ represents a mass of water required to prepare the power-law cement grout, and $m_c$ represents a mass of cement required to prepare the power-law cement grout.

Compared with the related art, the disclosure has the following beneficial effects:

On a basis of the quantitative relationship between the time-varying coefficient and the water-cement ratio of the power-law cement grout, the quantitative change law of the comprehensive effect of the water-cement ratio and time on the consistency coefficient of the power-law cement grout is considered, and then a quantitative calculation method for determining the consistency coefficient of the power-law cement grout is obtained. According to the method provided by the disclosure, the consistency coefficient index of the power-law cement grout (referred to as a cement grout with the water-cement ratio in the range of 0.50-0.75) widely used in the engineering practice can be directly and quickly obtained through theoretical calculation without the indoor rheological test. Therefore, the method of the disclosure saves time, manpower, and resources; and the obtained consistency coefficient is reasonable, scientific, and effective, as well as meets the actual requirements in the engineering practice. In summary, the disclosure has the advantages of being accurate and reliable, being calculated less, etc., and also has high practical value and popularization value in the technical field of environmental protection and ecological restoration.

BRIEF DESCRIPTION OF DRAWINGS

In order to more clearly illustrate technical solutions of embodiments of the disclosure, attached drawings that need to be used in the embodiments are briefly described below. It should be understood that the following attached drawings only illustrate some specific embodiments of the disclosure, and are therefore not to be considered as limiting the scope of the protection of the disclosure. Therefore, for those skilled in the related art, other relevant drawings can be obtained based on these attached drawings without creative labor.

DETAILED DESCRIPTION OF EMBODIMENTS

In order to make the objective, the technical solutions, and the advantages of the disclosure clearer, the disclosure will be further described below with reference to the attached drawings and the embodiments, and the embodiments of the disclosure include, but are not limited to the following embodiments. All other embodiments obtained by those skilled in the related art based on the embodiments of the disclosure without creative efforts shall fall within the scope of the protection of the disclosure.

In the embodiments, terms "and/or" are merely an association relationship describing associated objects, and indicate that there may be three schemes. For example, A and/or B may indicate that A exists alone, A and B exist at the same time, and B exists alone.

Terms such as "first" and "second" used in the embodiments of the disclosure aim to distinguish different objects, rather than to describe a specific order of an object. For example, a first target object and a second target object are used to distinguish that they are different target objects instead of describing a specific order of the two target objects.

In the embodiments of the disclosure, words such as "illustrative" or "for example" are used to describe an example, an illustration, or a description. Any embodiment or technical solution described as "illustrative" or "for example" among the embodiments of disclosure should not be construed as being more preferred or more advantageous than other embodiments or technical solutions. Rather, using the terms of "illustrative" or "for example" is intended to present related concepts in a particular manner.

In the description of the embodiments of the disclosure, unless otherwise specified, "a plurality of" means two or more. For example, a plurality of processing units refers to two or more processing units; and a plurality of systems refer to two or more systems.

Embodiment 1

Figure 1:
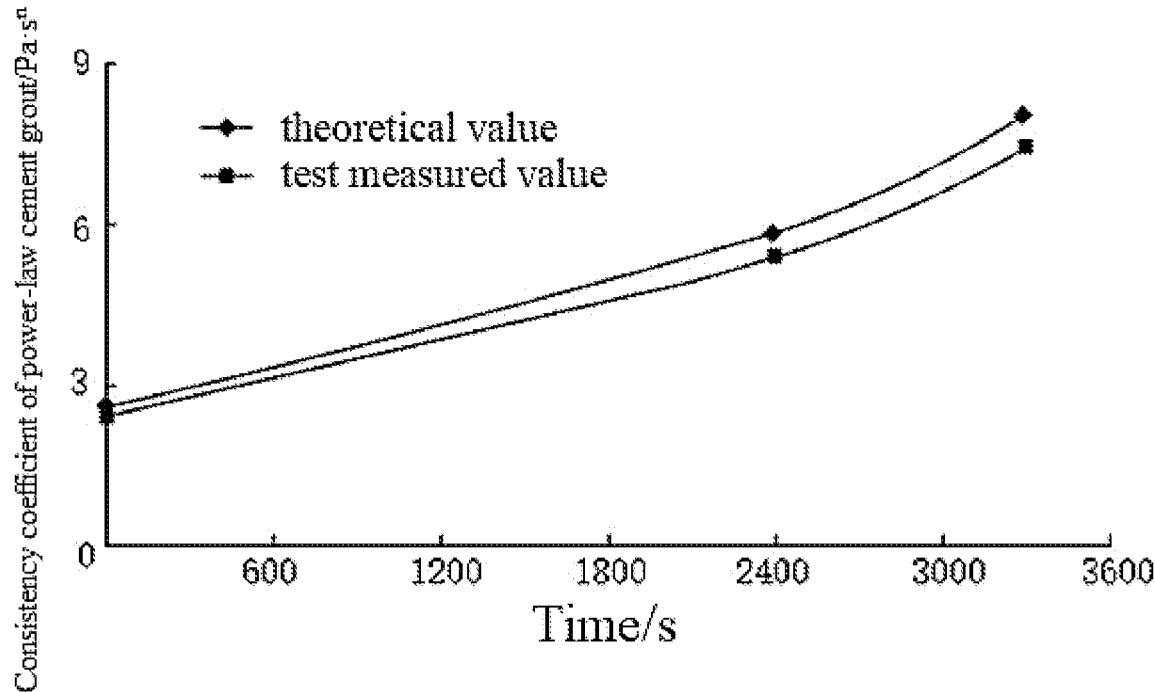
FIG. 1 illustrates a comparison diagram between theoretical values and test measured values of consistency coefficients of a power-law cement grout according to embodiments 1-3 of the disclosure.

As shown in FIG. 1, the embodiment 1 provides a method for determining a consistency coefficient of a power-law cement grout, and the method specially includes the following steps.

Step 1, a water-cement ratio $\omega$ of the power-law cement grout is determined as 0.53, i.e., $\omega=0.53$.

The water-cement ratio $\omega$ of the power-law cement grout is determined by the following formula:

$$\omega = \frac{m_w}{m_c}.$$

In the embodiment 1, $m_w$ represents a mass of water required to prepare the power-law cement grout, and $m_c$ represents a mass of cement required to prepare the power-law cement grout.

Step 2, according to engineering practice requirements, a time t required to determine the consistency coefficient c of the power-law cement grout is determined as 0 second (s), i.e., t=0 s.

Step 3, the consistency coefficient c of the power-law cement grout is obtained by the following formula:

$$c = 0.0387 \omega^{-6.610} e^{(0.000270 + 0.000141\omega)t}.$$

In the foregoing formula, c represents the consistency coefficient of the power-law cement grout (with a unit of pascal·$n^{th}$ power of second abbreviated as Pa·s$^n$); $\omega$ represents the water-cement ratio of the power-law cement grout (referred to as a dimensionless parameter); t represents the time required to determine the consistency coefficient c of the power-law cement grout (with a unit of s); and e represents a base of a natural logarithm.

It is determined that a theoretical value of the consistency coefficient c of the power-law cement grout in the embodiment 1 is 2.5719 Pa·s$^n$, and a test measured value $c_{measured}$ of the consistency coefficient c of the power-law cement grout obtained by using the steps according to the embodiment 1 is 2.3928 Pa·s$^n$, and a difference between the theoretical value and the test measured value is calculated by $$\frac{|c - c_{measured}|}{c} \times 100\%$$

and is equal to 6.96%.

Embodiment 2

As shown in FIG. 1, the embodiment 2 provides a method for determining a consistency coefficient of a power-law cement grout, and the method specially includes the following steps.

Step 1, a water-cement ratio ω of the power-law cement grout is determined as 0.53, i.e., ω=0.53.

Step 2, according to engineering practice requirements, a time t required to determine the consistency coefficient c of the power-law cement grout is determined as 2,400 s, i.e., t=2400 s.

Step 3, the consistency coefficient c of the power-law cement grout is determined.

It is determined that a theoretical value of the consistency coefficient c of the power-law cement grout in the embodiment 2 is 5.8825 Pa·s$^n$, and a test measured value $c_{measured}$ of the consistency coefficient c of the power-law cement grout obtained by using the steps according to the embodiment 2 is 5.4043 Pa·s$^n$, and a difference between the theoretical value and the test measured value is calculated by $$\frac{|c - c_{measured}|}{c} \times 100\%$$

and is equal to 8.13%.

Embodiment 3

As shown in FIG. 1, the embodiment 3 provides a method for determining a consistency coefficient of a power-law cement grout, and the method specially includes the following steps.

Step 1, a water-cement ratio ω of the power-law cement grout is determined as 0.53, i.e., ω=0.53.

Step 2, according to engineering practice requirements, a time t required to determine the consistency coefficient c of the power-law cement grout is determined as 3,300 s, i.e., t=3300 s.

Step 3, the consistency coefficient c of the power-law cement grout is determined.

It is determined that a theoretical value of the consistency coefficient c of the power-law cement grout in the embodiment 3 is 8.0224 Pa·s$^n$, and a test measured value $c_{measured}$ of the consistency coefficient c of the power-law cement grout obtained by using the steps according to the embodiment 3 is 7.4269 Pa·s$^n$, and a difference between the theoretical value and the test measured value is calculated by $$\frac{|c - c_{measured}|}{c} \times 100\%$$

and is equal to 7.42%.

Embodiment 4

Figure 2:
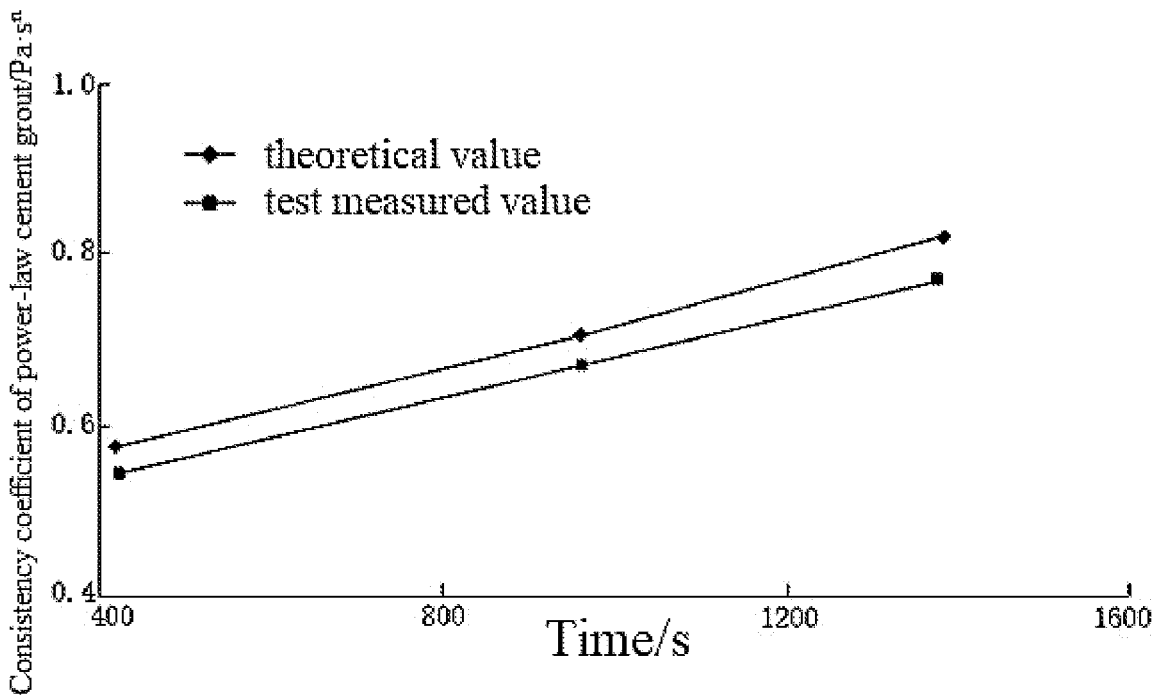
FIG. 2 illustrates a comparison diagram between theoretical values and test measured values of consistency coefficients of a power-law cement grout according to embodiments 4-6 of the disclosure.

As shown in FIG. 2, the embodiment 4 provides a method for determining a consistency coefficient of a power-law cement grout, and the method specially includes the following steps.

Step 1, a water-cement ratio ω of the power-law cement grout is determined as 0.68, i.e., ω=0.68.

Step 2, according to engineering practice requirements, a time t required to determine the consistency coefficient c of the power-law cement grout is determined as 420 s, i.e., t=420 s.

Step 3, the consistency coefficient c of the power-law cement grout is determined.

It is determined that a theoretical value of the consistency coefficient c of the power-law cement grout in the embodiment 4 is 0.5775 Pa·s$^n$, and a test measured value $c_{measured}$ of the consistency coefficient c of the power-law cement grout obtained by using the steps according to the embodiment 4 is 0.5455 Pa·s$^n$, and a difference between the theoretical value and the test measured value is calculated by $$\frac{|c - c_{measured}|}{c} \times 100\%$$

and is equal to 5.54%.

Embodiment 5

As shown in FIG. 2, the embodiment 5 provides a method for determining a consistency coefficient of a power-law cement grout, and the method specially includes the following steps.

Step 1, a water-cement ratio ω of the power-law cement grout is determined as 0.68, i.e., ω=0.68.

Step 2, according to engineering practice requirements, a time t required to determine the consistency coefficient c of the power-law cement grout is determined as 960 s, i.e., t=960 s.

Step 3, the consistency coefficient c of the power-law cement grout is determined.

It is determined that a theoretical value of the consistency coefficient c of the power-law cement grout in the embodiment 5 is 0.7037 Pa·s$^n$, and a test measured value $c_{measured}$ of the consistency coefficient c of the power-law cement grout obtained by using the steps according to the embodiment 5 is 0.6696 Pa·s$^n$, and a difference between the theoretical value and the test measured value is calculated by $$\frac{|c - c_{measured}|}{c} \times 100\%$$

and is equal to 4.84%.

Embodiment 6

As shown in FIG. 2, the embodiment 6 provides a method for determining a consistency coefficient of a power-law cement grout, and the method specially includes the following steps.

Step 1, a water-cement ratio ω of the power-law cement grout is determined as 0.68, i.e., ω=0.68.

Step 2, according to engineering practice requirements, a time t required to determine the consistency coefficient c of the power-law cement grout is determined as 1,380 s, i.e., t=1380 s.

Step 3, the consistency coefficient c of the power-law cement grout is determined.

It is determined that a theoretical value of the consistency coefficient c of the power-law cement grout in the embodiment 6 is 0.8206 Pa·s$^n$, and a test measured value $c_{measured}$ of the consistency coefficient c of the power-law cement grout obtained by using the steps according to the embodiment 6 is 0.7707 Pa·s$^n$, and a difference between the theoretical value and the test measured value is calculated by $$\frac{|c - c_{measured}|}{c} \times 100\%$$

and is equal to 6.08%.

Through the above technical solutions, the consistency coefficient c of the power-law cement grout can be accurately and reliably obtained, meets the requirements in the engineering practice, can provide theoretical guidance and technical reference for the engineering practice in environmental protection and ecological restoration, and has very high practical value and popularization value.

The above-mentioned embodiments are merely illustrated embodiments of the disclosure, and are not intended to limit the scope of the protection of the disclosure. Any variations made based on the design principles of the disclosure and without creative labor shall fall within the scope of the protection of the disclosure.

What is claimed is:

1. A method for determining a consistency coefficient of a power-law cement grout, comprising the following steps:
   determining a water-cement ratio $\omega$ of the power-law cement grout, wherein the water-cement ratio $\omega$ of the power-law cement grout is expressed by the following formula:

$$\omega = \frac{m_w}{m_c}, m_w$$

represents a mass of water required to prepare the power-law cement grout, and $m_c$ represents a mass of cement required to prepare the power-law cement grout;
   determining, according to engineering practice requirements, a time t required to determine the consistency coefficient c of the power-law cement grout; and
   obtaining the consistency coefficient c of the power-law cement grout based on a quantitative change rule between a comprehensive effect of the water-cement ratio $\omega$ and the time t and an influential effect of the comprehensive effect on the consistency coefficient c of the power-law cement grout, wherein the consistency coefficient c is expressed by the following formula:
   $c = 0.0387\omega^{-6.610}e^{(0.000270+0.000141\omega)t}$, e represents a base of natural logarithm, and $\omega \in (0.50, 0.75)$.

* * * * *